US010025808B2

(12) United States Patent
Avati

(10) Patent No.: US 10,025,808 B2
(45) Date of Patent: *Jul. 17, 2018

(54) COMPACTING CHANGE LOGS USING FILE CONTENT LOCATION IDENTIFIERS

(71) Applicant: Red Hat, Inc., Raleigh, NC (US)

(72) Inventor: Anand Avati, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 218 days.

This patent is subject to a terminal disclaimer.

(21) Appl. No.: 14/219,251

(22) Filed: Mar. 19, 2014

(65) Prior Publication Data

US 2015/0269213 A1 Sep. 24, 2015

(51) Int. Cl.
*G06F 17/30* (2006.01)

(52) U.S. Cl.
CPC .. *G06F 17/30368* (2013.01); *G06F 17/30067* (2013.01); *G06F 17/30076* (2013.01);
(Continued)

(58) Field of Classification Search
CPC ............ G06F 11/1435; G06F 11/1469; G06F 11/1474; G06F 3/0643; G06F 3/065; G06F 3/0652; G06F 17/30174; G06F 17/30176; G06F 17/30182; G06F 17/30212; G06F 17/30215; G06F 17/30221;
(Continued)

(56) References Cited

U.S. PATENT DOCUMENTS 5,511,177 A 4/1996 Kagimasa
5,544,360 A * 8/1996 Lewak .............. G06F 17/30126
(Continued)

OTHER PUBLICATIONS

Business Wire, "Gluster Announces Apache Hadoop Storage Compatibility in Latest GlusterFS Release", Published Aug. 23, 2011, Available at <http://www.businesswire.com/news/home/20110823005899/en/Gluster-Announces-Apache-Hadoop-Storage-Compatibility-Latest>, retreived Jan. 18, 2013.
(Continued)

*Primary Examiner* — Srirama Channavajjala
(74) *Attorney, Agent, or Firm* — Lowenstein Sandler LLP

(57) ABSTRACT

Systems and methods for compacting change logs using file content location identifiers. An example method may comprise: identifying a first change log record comprising an identifier of a first data structure referencing a first physical location of contents of a file before a first file system operation, the first change log record further comprising an identifier of a second data structure referencing a second physical location of the contents of the file after the file first system operation; identifying a second change log record comprising the identifier of the second data structure referencing the second physical location of the contents of the file before a second file system operation, the second change log record further comprising an identifier of a third data structure referencing a third physical location of the contents of the file after the second file system operation; and replacing the first change log record and the second change log record with a third change log record comprising the identifier of the first data structure and the identifier of the third data structure.

18 Claims, 7 Drawing Sheets

(52) U.S. Cl.
CPC .. *G06F 17/30091* (2013.01); *G06F 17/30353* (2013.01); *G06F 17/30864* (2013.01); *G06F 17/30952* (2013.01); *G06F 17/30997* (2013.01)

(58) Field of Classification Search
CPC ......... G06F 17/30227; G06F 17/30194; G06F 17/30377; G06F 17/30097; G06F 17/30067; G06F 17/30076; G06F 17/30091; G06F 17/30952; G06F 17/30115; G06F 17/30368; G06F 17/30336; G06F 17/30321; G06F 17/30353; G06F 17/3023; G06F 17/30312
See application file for complete search history.

(56) References Cited

U.S. PATENT DOCUMENTS

| | | |
|---|---|---|
| 5,627,996 A | 5/1997 | Bauer |
| 5,745,888 A | 4/1998 | Bauer et al. |
| 5,886,699 A | 3/1999 | Belfiore et al. |
| 5,951,649 A | 9/1999 | Dobbins et al. |
| 6,029,168 A | 2/2000 | Frey |
| 6,061,678 A | 5/2000 | Klein et al. |
| 6,421,686 B1 | 7/2002 | Martin, Jr. |
| 6,466,980 B1 | 8/2002 | Lumelsky et al. |
| 6,473,767 B1 | 10/2002 | Bailey |
| 6,697,846 B1 | 2/2004 | Soltis |
| 6,738,790 B1 | 5/2004 | Klein et al. |
| 6,856,993 B1 | 2/2005 | Verma |
| 7,080,102 B2 | 7/2006 | O'Connell et al. |
| 7,107,419 B1 | 9/2006 | Ghemawat |
| 7,418,439 B2 | 8/2008 | Wong |
| 7,739,240 B2 | 6/2010 | Saito et al. |
| 7,890,469 B1 | 2/2011 | Maionchi et al. |
| 7,890,632 B2 | 2/2011 | Hazelwood et al. |
| 7,921,268 B2 | 4/2011 | Jakob |
| 7,941,709 B1* | 5/2011 | Hong ................. G06F 11/0727 714/54 |
| 7,962,458 B2 | 6/2011 | Holenstein et al. |
| 8,150,805 B1 | 4/2012 | Tawri et al. |
| 8,321,380 B1 | 11/2012 | Leverett |
| 8,983,908 B2 | 3/2015 | Gowda |
| 9,110,917 B2 | 9/2015 | Avati |
| 2002/0107874 A1 | 8/2002 | Delorme et al. |
| 2003/0149709 A1 | 8/2003 | Banks |
| 2003/0159006 A1 | 8/2003 | Frank et al. |
| 2003/0163568 A1 | 8/2003 | Kano et al. |
| 2003/0182257 A1 | 9/2003 | O'Connell et al. |
| 2003/0182328 A1 | 9/2003 | Paquette |
| 2003/0191745 A1 | 10/2003 | Jiang et al. |
| 2003/0217119 A1 | 11/2003 | Raman et al. |
| 2004/0128556 A1* | 7/2004 | Burnett ............. G06F 17/30067 726/17 |
| 2004/0205152 A1 | 10/2004 | Yasuda |
| 2004/0260726 A1* | 12/2004 | Hrle ................. G06F 11/1466 |
| 2005/0027748 A1 | 2/2005 | Kisley |
| 2005/0071708 A1 | 3/2005 | Bartfai et al. |
| 2005/0114285 A1 | 5/2005 | Cincotta |
| 2005/0160427 A1* | 7/2005 | Ustaris ............. G06F 17/30073 718/100 |
| 2005/0289152 A1 | 12/2005 | Earl |
| 2006/0218210 A1 | 9/2006 | Sarma et al. |
| 2006/0259527 A1 | 11/2006 | Devarakonda |
| 2007/0011213 A1 | 1/2007 | Burton et al. |
| 2007/0022129 A1 | 1/2007 | Bahar |
| 2007/0038689 A1 | 2/2007 | Shinkai |
| 2007/0055702 A1* | 3/2007 | Fridella ............. G06F 17/30194 |
| 2007/0124271 A1* | 5/2007 | Bauchot ............ G06F 17/30112 |
| 2007/0185852 A1 | 8/2007 | Erefeev |
| 2007/0198550 A1 | 8/2007 | Irving |
| 2007/0245112 A1 | 10/2007 | Grubbs et al. |
| 2007/0288533 A1 | 12/2007 | Srivastava |
| 2007/0299955 A1 | 12/2007 | Hoffman et al. |
| 2008/0010322 A1 | 1/2008 | Lee |
| 2008/0109908 A1* | 5/2008 | Havens ................. G06F 21/53 726/27 |
| 2008/0235300 A1 | 9/2008 | Nemoto et al. |
| 2009/0119302 A1* | 5/2009 | Palmer ............. G06F 17/30368 |
| 2009/0150398 A1 | 6/2009 | Raut |
| 2009/0193107 A1 | 7/2009 | Srinivasan |
| 2009/0254592 A1 | 10/2009 | Marinov et al. |
| 2009/0276470 A1* | 11/2009 | Vijayarajan ....... G06F 17/30067 |
| 2009/0307245 A1 | 12/2009 | Mullen et al. |
| 2010/0005072 A1 | 1/2010 | Pitts |
| 2010/0107091 A1 | 4/2010 | Amsterdam et al. |
| 2010/0185585 A1 | 7/2010 | Schuchardt |
| 2010/0332456 A1 | 12/2010 | Prahlad et al. |
| 2011/0161294 A1 | 6/2011 | Vengerov et al. |
| 2011/0295804 A1 | 12/2011 | Erefeev |
| 2011/0313971 A1 | 12/2011 | Hironaga et al. |
| 2012/0136830 A1 | 5/2012 | Patocka |
| 2012/0185926 A1 | 7/2012 | Topatan et al. |
| 2012/0209898 A1* | 8/2012 | Leigh ................ G06F 17/30227 707/827 |
| 2012/0330894 A1 | 12/2012 | Slik |
| 2013/0024722 A1* | 1/2013 | Kotagiri ............. G06F 11/1004 714/6.1 |
| 2013/0054524 A1 | 2/2013 | Anglin et al. |
| 2013/0173530 A1* | 7/2013 | Laron ............... G06F 17/30165 707/608 |
| 2013/0325804 A1 | 12/2013 | Bachar |
| 2014/0019413 A1 | 1/2014 | Braam |
| 2014/0201177 A1 | 7/2014 | Suryanarayan et al. |
| 2015/0248434 A1 | 9/2015 | Avati et al. |
| 2015/0269183 A1 | 9/2015 | Avati |
| 2015/0269214 A1 | 9/2015 | Avati et al. |

OTHER PUBLICATIONS

Gluster Inc., "Gluster Filesystem Unified File and Object Storage—Beta 2", Published Aug. 2011, pp. 1-27, Available at <http://hypnotoad.uchicago.edu/roll-documentation/glusterfs/6.0/Gluster_Unified_File_and_Object_Storage.pdf>, retrieved Jan. 18, 2013.
Golub, Ben, "Why I believe in UFOS: Unified file and object storage," Computerworld Blogs, Jul. 28, 2011, 6 pages.
Raghavendra, G., "Change Ie8ddc0fb: Fuse: Auxiliary GFID Mount Support", Gluster.org, updated Jul. 19, 2013, 5 pages http://review.gluster.org/#/c/4702/.
"Change I755757fb7: Features/Changelog: Changelog Translator", Review.gluster.org, updated Jul. 22, 2013, 5 pages http://review.gluster.org/#/c/5127/.
Suryanarayan, Amar Tumballi, and Avati, Anand Vishweswaran, "Accessing a File System Using a Hard Link Mapped to a File Handle", U.S. Appl. No. 13/740,084, filed Jan. 11, 2013, Red Hat, Inc., 48 pages.
USPTO Office Action for U.S. Appl. No. 13/740,084, dated May 22, 2013.
USPTO Office Action for U.S. Appl. No. 13/740,084, dated Nov. 6, 2013.
Avati, Anand and Suryanaraya, Amar Tumballi, "Identifying Files In Change Logs Using File Content Location Identifiers", U.S. Appl. No. 14/219,255, filed Mar. 19, 2014.
Avati, Anand, "File Replication Using File Content Location Identifiers", U.S. Appl. No. 14/219,250, filed Mar. 19, 2014.
Avati, Anand, "Identifying Files in Change Logs Using File Content Location Identifiers", U.S. Appl. No. 14/219,255, filed Mar. 19, 2014.
Avati, Anand Vishweswaran and Karampuri, Pranith Kumar, "Delayed Asynchronous File Replication in A Distributed File System", U.S. Appl. No. 14/193,581, filed Feb. 28, 2014.
Birrell, Andrew D. et al., "The Echo Distributed File System", Sep. 10, 1993, 26 Pages http://www.hpl.hp.com/techreports/Compaq-DEC/SRC-RR-111.pdf.
Matheis, Johannes and Mussig, Michael, "Bounded Delay Replication in Distributed Databases with Eventual Consistency", Dec. 17, 2003, 100 Pages http://www.diva-portal.org/smash/get/diva2:3243/FULLTEXT02.pdf.

(56) References Cited

OTHER PUBLICATIONS

USPTO Office Action for U.S. Appl. No. 14/219,250 dated Dec. 4, 2015.
USPTO Office Action for U.S. Appl. No. 14/219,255 dated Dec. 17, 2015.
USPTO, Final Office Action for U.S. Appl. No. 14/219,250, dated Mar. 23, 216.
USPTO, Office Action for U.S. Appl. No. 14/219,250, dated Jul. 1, 2016.
USPTO, Advisory Action for U.S. Appl. No. 14/219,250, dated Jun. 8, 2016.
USPTO, Final Office Action for U.S. Appl. No. 14/219,255, dated Apr. 8, 2016.
USPTO, Office Action for U.S. Appl. No. 14/219,255, dated Aug. 25, 2016.
USPTO, Advisory Action for U.S. Appl. No. 14/219,255, dated Jun. 10, 2016.
USPTO, Office Action for U.S. Appl. No. 14/219,250, dated Feb. 13, 2017.
USPTO, Advisory Action for U.S. Appl. No. 14/219,250, dated Jan. 6, 2017.
USPTO, Final Office Action for U.S. Appl. No. 14/219,250, dated Jun. 30, 2017.
USPTO, Office Action for U.S. Appl. No. 14/219,250, dated Sep. 5, 2017.
USPTO, Final Office Action for U.S. Appl. No. 14/219,255, dated Jan. 12, 2017.
USPTO, Final Office Action for U.S. Appl. No. 14/219,255, dated Sep. 7, 2017.
USPTO, Office Action for U.S. Appl. No. 14/193,581, dated Apr. 20, 2016.
USPTO, Final Office Action for U.S. Appl. No. 14/193,581, dated Sep. 20, 2016.
USPTO, Office Action for U.S. Appl. No. 14/193,581, dated Jan. 9, 2017.
USPTO, Final Office Action for U.S. Appl. No. 14/193,581, dated Jul. 10, 2017.
USPTO, Notice of Allowance for U.S. Appl. No. 14/219,255, dated Dec. 29, 2017.

* cited by examiner

| 310 Record type | 320 Parent object ID | 330 Object previous ID | 340 Object current ID | 350 Object name |
|---|---|---|---|---|
| E | 1 | 0 | 10F9 | a1.doc |
| E | 1 | 0 | 10F9 | a2.doc |
| E | 1 | 10F9 | 0 | a1.doc |
| E | 100 | 0 | 10F9 | a3.doc |
| E | 1 | 10F9 | 0 | a2.doc |
| E | 100 | 0 | 10F9 | a4.doc |
| E | 100 | 10F9 | 0 | a3.doc |
| E | 100 | 10F9 | 12F4 | a4.doc |

FIG. 3

COMPACTING CHANGE LOGS USING FILE CONTENT LOCATION IDENTIFIERS

BACKGROUND

In modern operating systems, files may be referenced by file names. For example, in Unix family of operating systems, a file may be referenced by one or more names (e.g., hard links). Conversely, a "soft link" refers to a link to a file name, rather than to a file itself.

Files may be arranged in directories. A directory may contain a list of file names or links. The term "file" may also include directories, thus facilitating the existence of directory hierarchies, i.e., directories containing sub-directories. A file name may uniquely identify the file within the directory containing the file. The file name and the path to the directory containing the file may uniquely identify the file among all other files in the computer system.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 schematically illustrates a fragment of an example change log file, in accordance with one or more aspects of the present disclosure;

DETAILED DESCRIPTION

Figure 1:
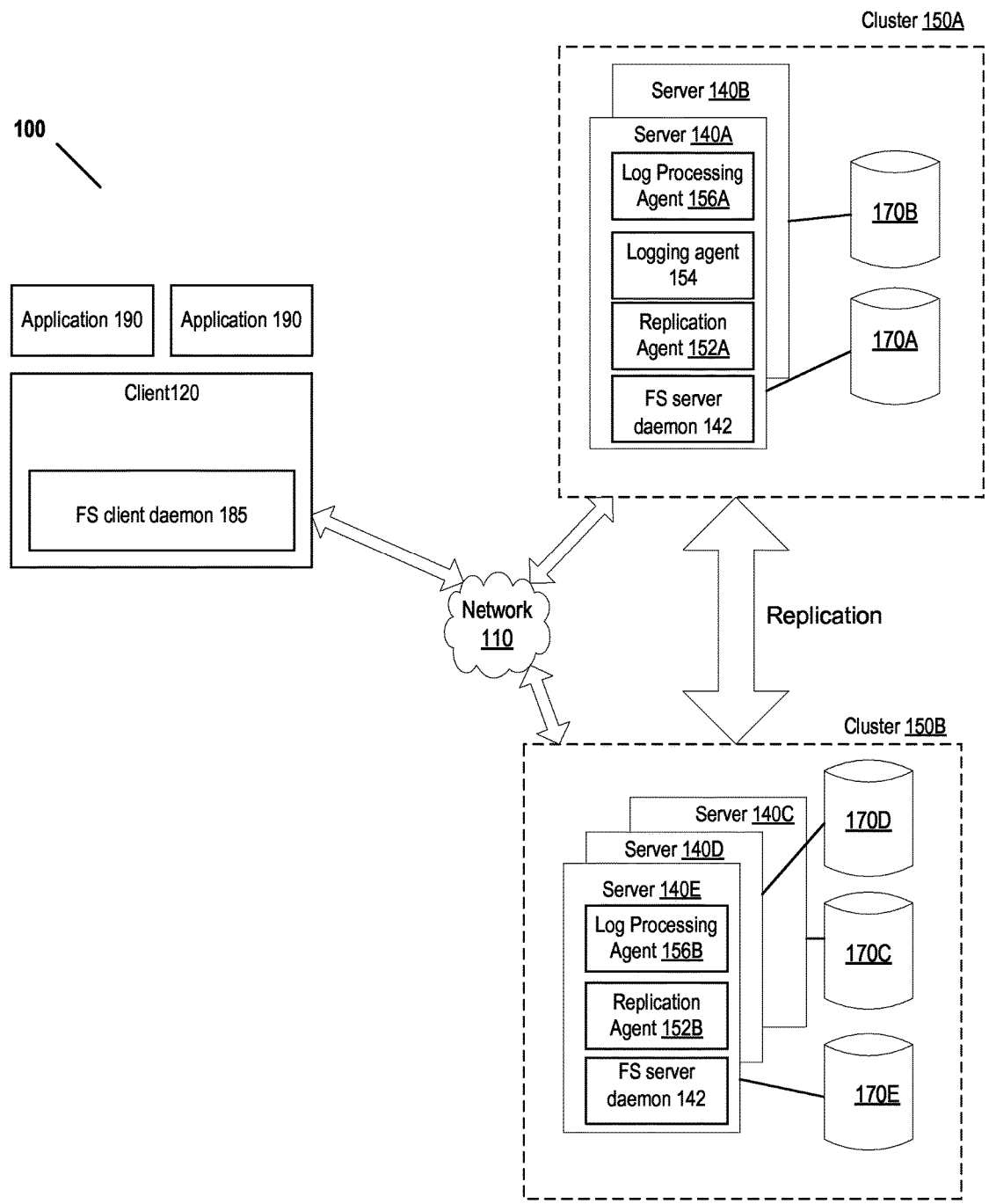
FIG. 1 schematically depicts component diagrams of example computer systems, in accordance with one or more aspects of the present disclosure.

Described herein are methods and systems for compacting change logs using file content location identifiers. In certain implementations, a distributed file system may be provided by a network attached storage (NAS) system comprising one or more file server computer systems each coupled to one or more persistent data storage devices, such as magnetic or optical storage disks, solid-state drives (SSDs), etc. "Computer system" or "computer" herein shall refer to a system comprising one or more processors, one or more memory devices, and one or more input/output (I/O) interfaces.

A file server may execute a network file system (NFS) server to manage file input/output (I/O) requests originated by NFS clients. One or more client computers can execute file system clients (e.g., NFS clients) to communicate with one or more file servers.

In certain implementations, a distributed file system may comprise two or more server clusters which may reside in geographically distributed locations. Data replication between geographically distributed clusters may be referred to as geo-replication. Volume-level replication may be performed from a cluster of the distributed file system that has been designated as a master to one or more clusters that have been designates as slaves. Volume-level replication may comprise various file system operations performed on a plurality of files comprised by a file system volume.

In certain implementations, volume-level replication may comprise a plurality of file system operations identifying each file or directory by its filename or directory name, respectively. However, if a file residing on the master file system has been renamed after being replicated to a slave file system, without modifying the file contents, the filename-based replication would, on the slave file system, result in deleting the existing file identified by the old name and copying the contents of the file from the master file system to the slave file system, in order to create a file with the new name on the slave. Since the replication agent identifies files by their file names, it has no means to determine that the copying operation is redundant, as the contents of the file were not changed.

Furthermore, identifying files and/or directories by their respective names may not always work correctly for files referenced by one or more hard links. "Hard link" herein refers to a directory record that associates a name with a file. Certain file systems allow multiple hard links to be created for the same file, thus allowing multiple aliases for the file name, so that when the file is opened by referencing any of the hard links associated with the file, the changes that are made to the file contents will be visible when the file is opened by referencing any other hard links associated with the file. Deleting a file by referencing any of the hard links associated with the file, if there are two or more hard links referencing the same physical location on a storage device, would only delete the referenced hard link, but not the file contents or other hard links associated with the file. As a directory is a special type of a file, multiple hard links to directories are also possible, although this feature may not be enabled in certain operating systems.

In the process of file replication, if a file is referenced, on the master file system, by one or more hard links, then two or more copies of the file would be created on the slave file system by the replication agent, as the latter has no means to determine that the hard links identify the same physical location of the file on a storage device. Furthermore, if the contents of such a file are modified on the master file system by a process referencing the file by one of the hard links, then only the copy corresponding to that hard link would be modified on the slave file system by the replication agent, as the latter has no means to determine that the hard links identify the same physical location of the file on a storage device.

To address the above noted and other deficiencies, the present disclosure provides systems and methods for identifying files residing on the file system by unique identifiers associated with physical locations of the files on storage devices, rather than by the file names. The present disclosure further provides systems and methods for maintaining change log files using unique identifiers associated with physical locations of the files on storage devices, rather than by the file names. The present disclosure further provides systems and methods for compacting change log files using unique identifiers associated with physical locations of the files on storage devices, rather than by the file names.

The methods described herein may be employed by file replication and for certain other operations on distributed file systems (e.g., backup, self-healing, and storage media defect detection procedures). Various aspects of the above referenced methods and systems are described in details herein below by way of examples, rather than by way of limitation.

FIG. 1 schematically depicts a high-level component diagram of an example distributed file system 1000 operating in accordance with one or more aspects of the present disclosure. Distributed file system 100 may include one or more storage clusters 150A-150B. Each storage cluster may comprise one or more file servers 140A-140E configured to individually and/or collectively store files and service file access requests (such as requests to create, access or modify a specified file). In the illustrative example of FIG. 1, each file server 140 may include one or more data storage devices 170A-170E. "Data storage device" herein shall refer to a memory device, such as a disk, RAID array, EEPROM device, or any other device capable of storing data.

One or more client computers 120 may be communicatively coupled, e.g., over a network 110, to file servers 140. A file server 140 may run a file system server daemon (or any other component such as a module or program) 142 to export a local file system to clients 120 as one or more volumes accessible by the clients.

Network 110 may be provided by one or more local area networks, one or more wide area networks, or any combination thereof. Client computer 120 may execute a file system client daemon 185 to connect to one or more servers 140 via an application-level protocol implemented over TCP/IP, InfiniBand or other transports, in order to access the file system volumes exported by one or more servers 140. Client computer 120 may further execute one or more applications 190.

In an illustrative example, cluster 150A may be designated as the master cluster, and cluster 150B may be designated as a slave cluster. In another illustrative example, there may be provided two or more slave clusters. In various examples, master cluster 150A and slave cluster 150B may have the same configuration of different configurations, with respect to servers, storage devices, and other cluster features. In certain implementations, master cluster 150A and one or more slave clusters 150B may reside in geographically distributed locations.

Replication agents 152A, 152B running on servers 140 may be configured to perform volume-level replication of master cluster 150A to one or more slave clusters 150B. In an illustrative example, replication agents 152A, 152B may constantly or periodically execute a background replication process to synchronize the file system volumes on master cluster 150A and one or more slave clusters 150B.

In certain implementations, a logging agent 154 running on master cluster 150A may maintain a change log file reflecting the file system operations performed upon the file system objects (e.g., creation, modification, or deletion of files or directories) of the master cluster. Log processing agents 156A-B running on one or more file system servers 140 may analyze the change log file before feeding it to a replication agent 152. Log processing agent 156 may iterate through the change log records to identify chains of log records that may be merged into a single record, as described in more details herein below. Replication agent 152 may iterate through the change log records and perform, on one or more slave clusters 150B, the file operations specified by the change log record, as described in more details herein below.

In certain implementations, the replication agent may reference each file system object (a file or a directory) by an identifier of a data structure that comprises one or more identifiers of the physical locations of the contents of the file system object on a storage device, rather than identifying file system objects by their names, in order to avoid the above described redundant copying operations associated with file renaming and/or file aliasing by hard links. In an illustrative example, the replication agent may reference file system objects by identifiers of their index nodes.

"Index node" or "inode" herein shall refer to a data structure associated with a file system object (e.g., a file or a directory). An inode representing a file system object may comprise one or more identifiers of physical locations (e.g., disk blocks) that store the contents of the file system object. An inode may further comprise various attributes of the file system object, including manipulation metadata (e.g., file creation, access, and/or modification time), as well as owner and permission metadata (e.g., group identifier, user identifier, and/or permissions). An inode may be identified by its number.

In certain implementations, a plurality of inodes may be stored in an inode table residing in a known physical location on a storage device. The inode table may be indexed by the inode numbers, so that a file system driver may access the inode associated with a given file and retrieve the identifier of the file physical location and/or file metadata. Alternatively, instead of implementing an inode table, certain file systems may store equivalent data in various other data structures.

In conventional file systems, when an inode is created, it may be assigned an arbitrary identifier (inode number), e.g., a random number. Hence, a file on the master cluster and a replica of the file on a slave cluster would have two different inode numbers, thus making it impractical for various clients (including, e.g., file replication agents) that need to access files on both master and slave clusters to reference the files by their inode numbers. The present disclosure resolves the issue of a file on the master cluster and its replica on a slave cluster being associated with two different inode numbers, by assigning the inode identifier associated with a particular file on the master cluster to the inode associated with a replica of the file on a slave cluster. Hence, both the file on the master cluster and the replica of the file on the slave cluster are associated with inodes having identical inode identifiers, thus enabling various clients (including, e.g., file replication agents) that need to access files on both master and slave clusters to reference the files by their inode numbers.

In certain implementations, for each file, the file system server may create a file name alias comprising an identifier of the respective inode, e.g., by creating a hard link with a name comprising the identifier of the inode referenced by the hard link. All such hard links may be placed in a pre-defined directory (e.g., a hidden directory) where they can be accessed by various clients (including, e.g., file replication agents), as schematically illustrated by FIG. 2.

Figure 2:
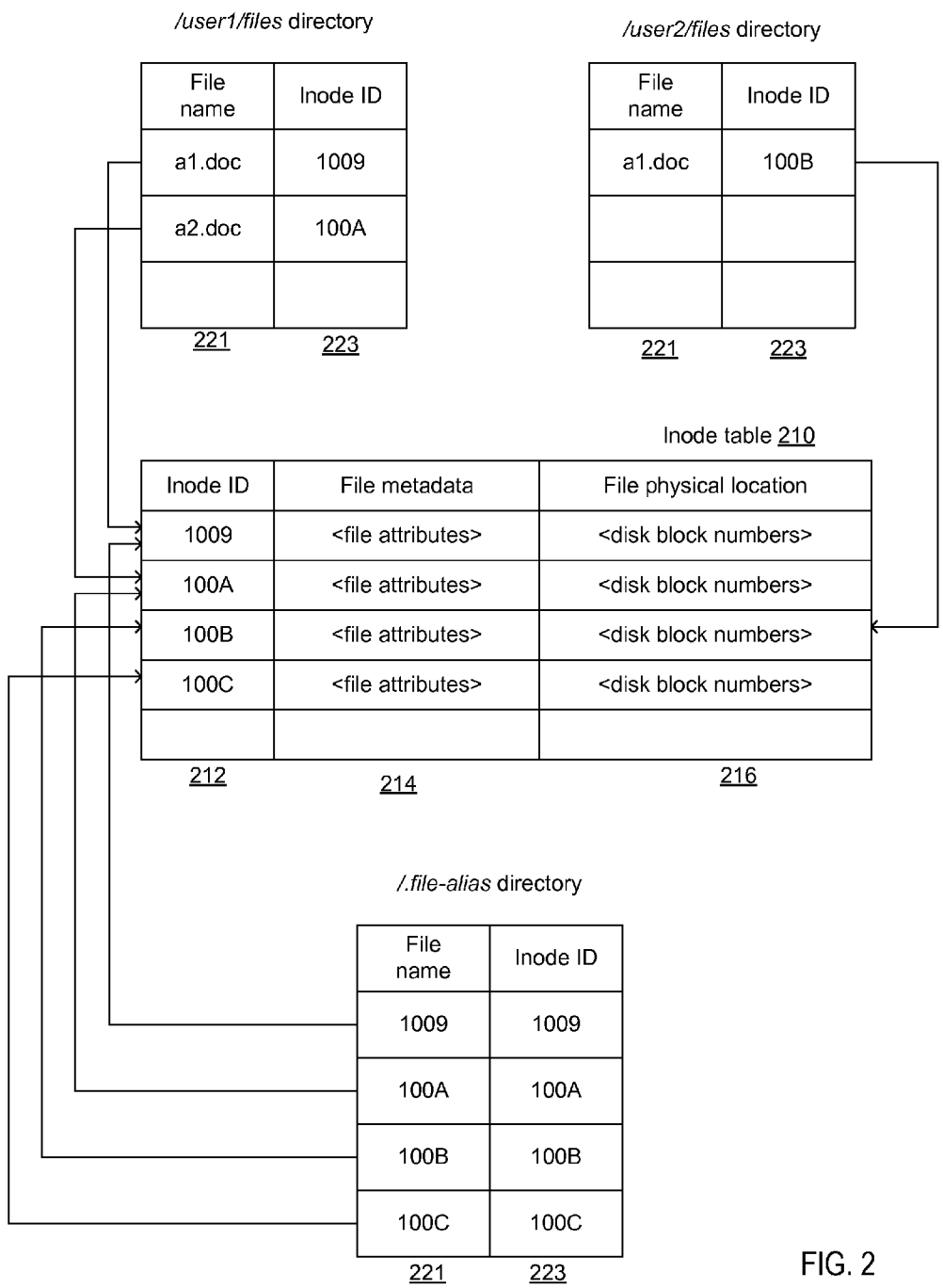
FIG. 2 schematically illustrates creating file aliases comprising file unique identifiers, in accordance with one or more aspects of the present disclosure.

In the illustrative example of FIG. 2, inode table 210 comprises a plurality of inode data structures graphically represented by the rows of table 210. Each inode data structure comprises an inode identifier 212, file attributes 214, and an identifier 216 of the physical location of the file contents. In various examples, inode identifier 212 may be provided by a unique number indexing inode table 210. File attributes 214 may comprise various attributes of the file system object, including manipulation metadata (e.g., file creation, access, and/or modification time), as well as owner and permission metadata (e.g., group identifier, user identifier, and/or permissions). Physical location identifier 216 may comprise identifiers of one or more disk blocks that store the contents of the file system object.

In the illustrative example of FIG. 2, directory named /user1/files may comprise the files a1.doc and a2.doc, and directory named /user2/files may comprise the file a1.doc. Each directory record may comprise a file name 221 and an identifier of the inode 223 associated with the file. For each file of a plurality of files on the file system, a hard link having a name that comprises the identifier of the inode referenced by the hard link is placed into /.file-aliases directory. Thus, the file named /user1/files/a1.doc references the inode number 1009, and the same inode is referenced by the file named /.file-aliases/1009; the file named /user1/files/a2.doc references the inode number 100A, and the same inode is referenced by the file named /.file-aliases/100A; and the file named /user2/files/a1.doc references the inode number 100B, and the same inode is referenced by the file named /.file-aliases/100B.

As noted herein above, logging agent 154 running on the master file system server may maintain a change log file reflecting the operations performed upon the file system objects (e.g., creation, modification, or deletion of files). The change log may identify the file system objects by their respective content location identifiers (e.g., inode identifiers).

Change log records may be inserted in the change log in the order in which the corresponding file system operations were performed. One or more change log records may optionally include a timestamp. In certain implementations, the change log file may be rolled over after expiration of a pre-defined time period (e.g., 60 seconds) since the change log initialization or previous roll over.

In certain implementations, the change log may comprise change log records of three types, including "ENTRY," "DATA," and "METADATA." Each change log record may comprise the record type which in an illustrative example may be encoded by "E," "D," and "M" for "ENTRY," "DATA," and "METADATA," respectively.

A change log record of type "DATA" may reflect one or more file system operations that result in modification of the contents of a file system object. A change log record of type "DATA" may comprise a unique identifier of the affected file system object (e.g., the identifier of the inode associated with the file systems object).

A change log record of type "METADATA" may reflect one or more file system operations that results in modification of the metadata associated with a file system object (e.g., file or directory attributes such as manipulation, ownership, or permission metadata). A change log record of type "METADATA" may comprise a unique identifier of the affected file system object (e.g., the identifier of the inode associated with the file system object). In certain implementations, the change log record may further comprise an identifier of the affected attribute of the file system object.

A change log record of type "ENTRY" may reflect one or more directory-level file system operations, such as file or directory creation, file or directory deletion, file or directory renaming, hard link creation, and hard link deletion operations. As schematically illustrated by FIG. 3, a change log record of type "ENTRY" may comprise the record type 310 (e.g., encoded by "E" character). The change log record may further comprise the unique identifier 320 of the parent of the affected file system object, the previous (i.e., before completion of the file system operation that is reflected by the change log record) unique identifier 330 of the affected file system object, the current unique identifier 340 of the affected file system object, and the file system object name 350 (e.g., the file name or directory name). The unique identifiers of the file system objects may be provided by their respective content location identifiers (e.g., inode identifiers). The parent file system object for a particular file may be represented by a directory comprising the particular file, and the parent file system object for a particular directory may be represented by a higher level directory comprising the particular directory.

In certain implementations, a non-existent file system object may be referenced by a first reserved unique identifier (e.g., inode number=0). The file system root object may be referenced by a second reserved unique identifier (e.g., inode number=1).

In the illustrative example of FIG. 3, log record 302 describes creating, in the file system root directory (inode number=1), a file named a1.doc associated with the inode number 10F9. As the file did not exist previously, the previous file content location identifier (inode number) is set to zero.

Log record 304 describes creating, in the file system root directory, a hard link to the file/a1.doc (referenced by inode number 10F9), having the file name alias a2.doc.

Log record 306 describes deleting the file a1.doc residing in the file system root directory. The file contents were not deleted, as there is another active hard link (/a2.doc) referencing the same inode.

Log records 304 and 306 may collectively describe renaming the file/a1.doc to /a2.doc, by creating the hard link with the file name alias a2.doc referencing the same file contents, and then deleting the hard link to the original file name.

Log record 308 describes creating, in the file system directory associated with inode number 100, a hard link to the file/a2.doc, with the file name alias a3.doc.

Log record 312 describes deleting the file a2.doc residing in the file system root directory. The file contents were not deleted, as there is another active hard link (a3.doc) referencing the same inode.

Log records 308 and 312 may collectively describe moving the file/a2.doc to file a3.doc residing in the file system directory associated with inode number 100, by creating the hard link having the file name alias a3.doc referencing the same file contents, and then deleting the hard link to the original file name.

Log record 314 describes creating, in the file system directory associated with inode number 100, a hard link to the file a3.doc, having the file name alias a4.doc.

Log record 316 describes deleting the file a3.doc residing in the file system directory associated with inode number 100. The file contents were not deleted, as there is another active hard link (a4.doc) referencing the same inode.

Log records 312 and 314 may collectively describe renaming the file a3.doc to a4.doc, by creating the hard link with the file name alias a4.doc referencing the same file contents, and then deleting the hard link to the original file name.

In certain implementations, multiple file system operations on a particular file which were performed within a pre-defined time period corresponding to the logging period may be reflected by a single change log record.

While FIG. 3 shows the log file entries in the table form, in various other implementations the log file may be maintained as a text file with each log record located on a separate line delimited by <CR/LF> characters, or as a binary file having fixed-length or variable length records.

The change log file may be used by a volume-level replication agent, as well as by certain other procedures accessing the files (e.g., backup, self-healing, storage media defect detection procedures). In an illustrative example, replication agent 152 may iterate through records of the change log file of master cluster 150A. For each change log record, replication agent 152 may construct a file name alias of the file referenced by its inode identifier. In an illustrative example, replication agent 152 may by append the inode identifier referenced by the change log record to a path to a pre-defined directory that stores file name aliases, where each file name alias comprises the identifier of the inode that stores the metadata for the file referenced by the file name alias, as described in more details herein above.

Upon constructing the file name alias for the file referenced by a change log record, replication agent 152 may perform, on one or more slave clusters 150B, the operations specified by the change log record. In an illustrative example, replication agent 152 may copy the file specified by the change log record from master cluster 150A to one or more slave clusters 150B. In various illustrative examples, replication agent 152 may delete, create, or rename, on one or more slave clusters 150B, the file specified by the change log record.

Figure 4:
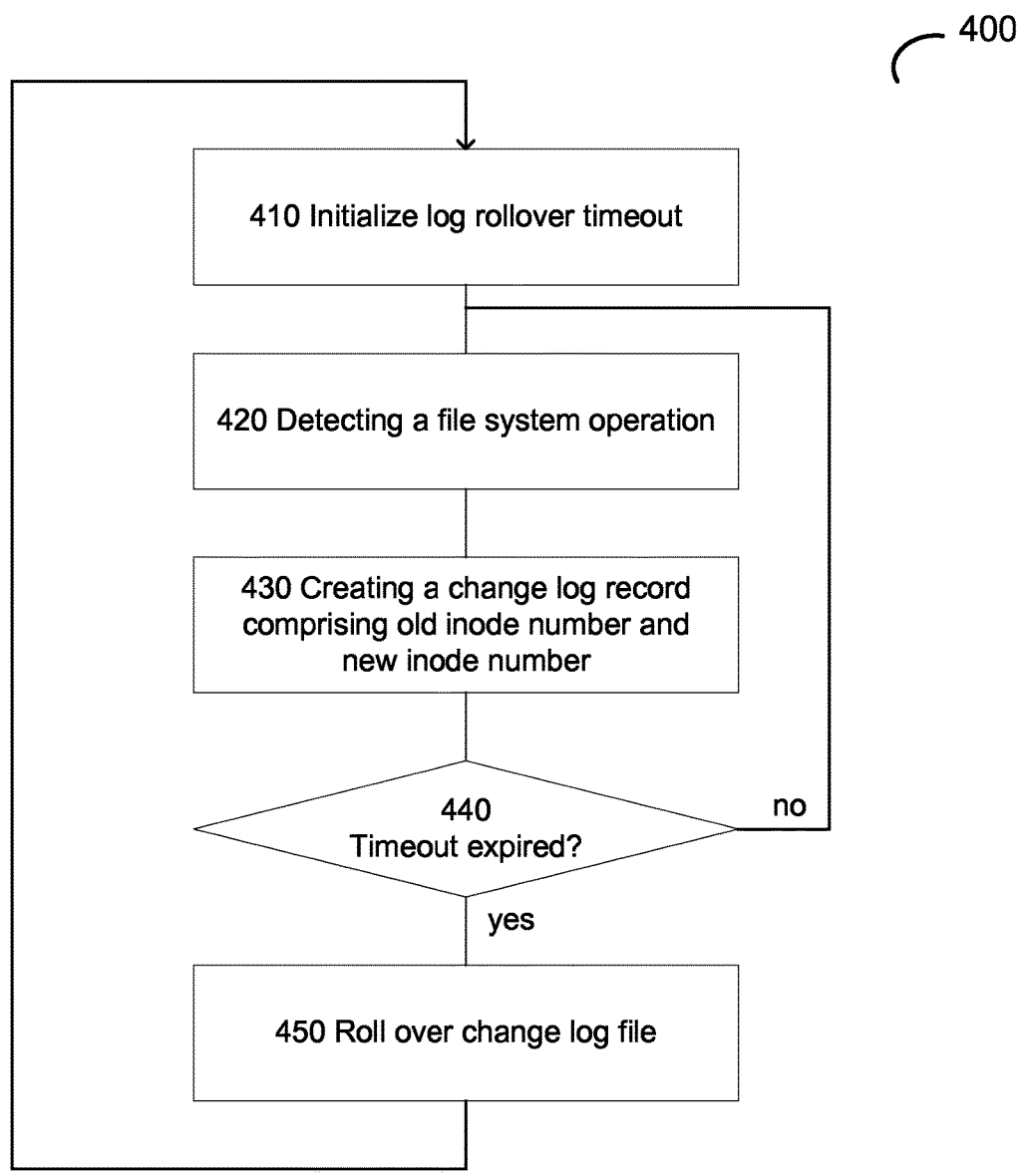
FIG. 4 depict a flow diagram of an example method for identifying files in change logs using file content location identifiers, in accordance with one or more aspects of the present disclosure.

FIG. 4 depicts a flow diagram of an example method 400 performed by a distributed file system server for identifying files in change logs using file content location identifiers. Method 400 and/or each of its individual functions, routines, subroutines, or operations may be performed by one or more processors of the computer system (e.g., file server 140 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a logging agent running on a file system server may initialize the change log rollover timeout, upon expiration of which the change log file may be rolled over. In an illustrative example, the timeout may be initialized to 60 seconds.

At block 420, the logging agent may detect a file system operation associated with a file.

At block 430, the logging agent may append a change log record to the change log file. A change log record reflecting one or more directory-level file system operations (e.g., file or directory creation, file or directory deletion, file or directory renaming, hard link creation, and hard link deletion operations) may comprise a record type, the unique identifier of the parent of the affected file system object, the previous (i.e., before the file system operation that is reflected by the change log record) unique identifier of the affected file system object, the current unique identifier of the affected file system object, and the file system object name (e.g., the file name or directory name), as described in more details herein above with references to FIG. 3. The unique identifiers of the file system objects may be provided by their respective inode identifiers. The parent file system object for a particular file may be represented by a directory comprising the particular file, and the parent file system object for a particular directory may be represented by a higher level directory comprising the particular directory.

A change log record reflecting one or more file system operations that result in modification of the contents of a file system object may comprise a unique identifier of the affected file system object (e.g., the identifier of the inode associated with the file systems object).

A change log record reflecting one or more file system operations that results in modification of the metadata associated with a file system object (e.g., file or directory attributes such as manipulation, ownership, or permission metadata) may comprise a unique identifier of the affected file system object (e.g., the identifier of the inode associated with the file system object). In certain implementations, the change log record may further comprise an identifier of the affected attribute of the file system object.

Responsive to ascertaining, at block 440, that a pre-defined timeout has expired, the processing may continue at block 450; otherwise the method may loop back to block 420.

At block 450, the logging agent may roll over the change log file and the processing may loop back to block 410.

In certain implementations, the change log produced by method 400 and by a similar method in accordance with one or more aspects of the present disclosure, may be compacted to reflect by a single change log entry two or more file system operations performed on a particular file. In an illustrative example, a log processing agent 156 running on a file system server 140 may analyze a change log before feeding the change log to replication agent 152 of FIG. 1. Alternatively, the functionality of log processing agent 156 may be incorporated into logging agent 154 and certain log compacting operations may be performed "on the fly" in parallel with appending change log records to a change log file.

In certain implementations, log processing agent 156 may iterate through the change log records to identify chains of log records where the current identifier of a file system object in one record matches the previous identifier of the file system object in another record. Upon identifying a chain comprising two or more log records, the log processing agent may merge the records into one record. The previous identifier of the file system object of the resulting log record may match the previous identifier of the file system object of the first log record comprised by the chain. The current identifier of the file system object of the resulting log record may match the current identifier of the file system object of the last record comprised by the chain. If the resulting log record has the previous identifier of the file system object matching the current identifier of the file system object, the resulting log record may be discarded as describing a file system operation resulting in no changes to any file system objects.

In the above described illustrative example of FIG. 3, log record 302 describes creating, in the file system root directory (inode number=1), a file named a1.doc associated with the inode number 10F9. As the file did not exist previously, the previous file content location identifier (inode number) is set to zero. Log record 304 describes creating, in the file system root directory, a hard link to the file/a1.doc (referenced by inode number 10F9), having the file name alias a2.doc. Log record 306 describes deleting the file a1.doc residing in the file system root directory. The file contents were not deleted, as there is another active hard link (/a2.doc) referencing the same inode.

As the current identifier of the file system object in change log record 302 being equal to 10F9 matches the previous identifier of the file system object in change log record 306, and both change log records have the same object name and the same parent object identifier, the two change log records may be merged into a single record which has the previous identifier of the file system object of change log record 302 and the current identifier of the file system object of change log record 306. As the resulting record has the same values of the previous identifier of the file system object and the current identifier of the file system object, it can be discarded as describing a file system operation resulting in no changes to any file system objects.

In another example, as schematically illustrated by FIG. 3, log record 314 describes creating, in the file system directory associated with inode number 100, a hard link to the file a3.doc, having the file name alias a4.doc. Log record 316 describes deleting the file a3.doc residing in the file system directory associated with inode number 100. The file contents were not deleted, as there is another active hard link (a4.doc) referencing the same inode. Log record 318 describes assigning the file name a4.doc to a file system object identified by inode number 12F4.

As the current identifier of the file system object in change log record 314 being equal to 10F9 matches the previous identifier of the file system object in change log record 318, and both change log records have the same object name and the same parent object identifier, the two change log records may be merged into a single record which has the previous identifier of the file system object of change log record 314 and the current identifier of the file system object of change log record 316. The resulting change log record would thus describe creating, in the directory identified by inode=100, a file system object named a4.doc and associated with inode number 12F4.

Figure 5:
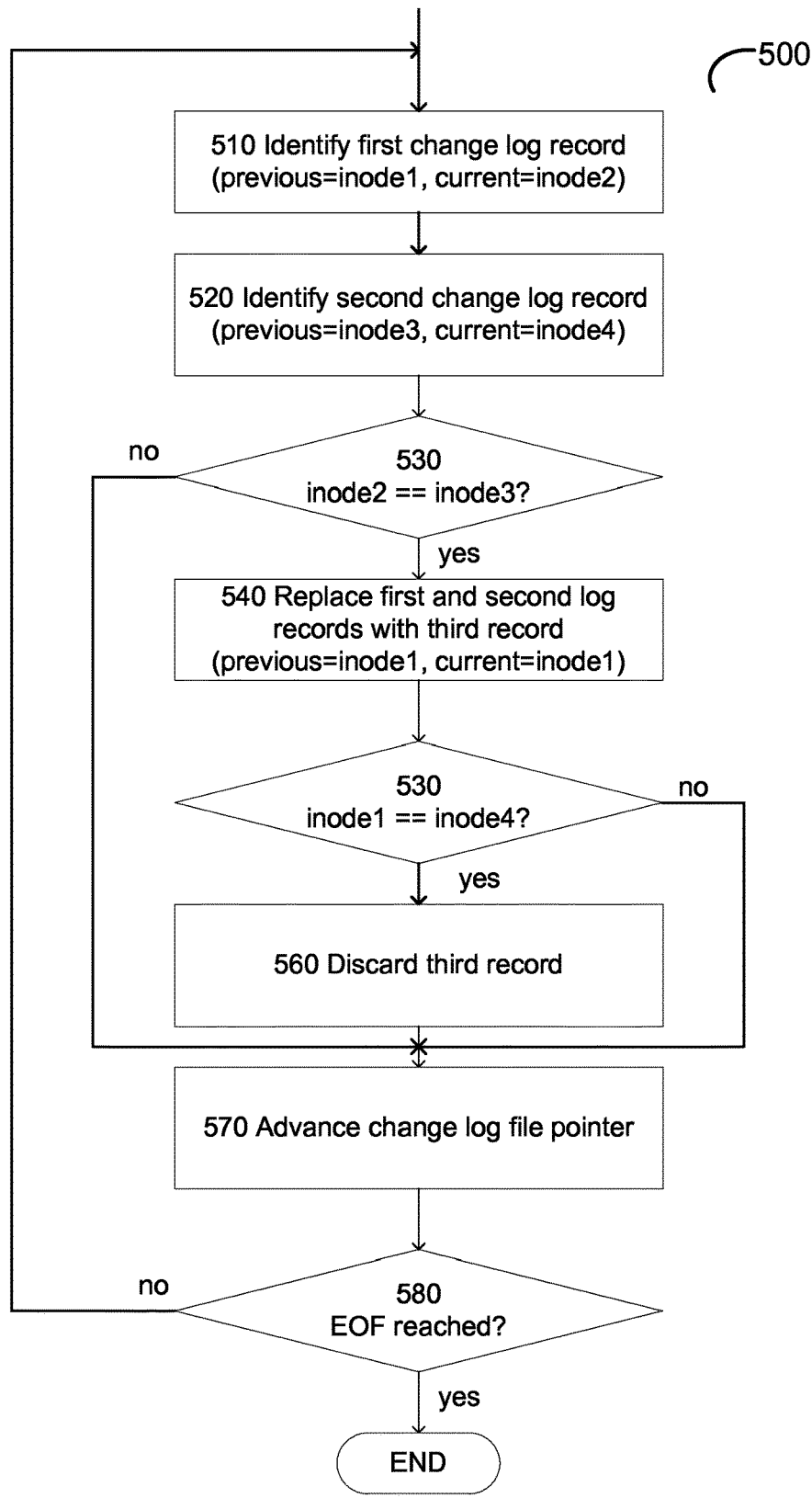
FIG. 5 depict a flow diagram of an example method for compacting change logs using file content location identifiers, in accordance with one or more aspects of the present disclosure.

FIG. 5 depicts a flow diagram of an example method 500 performed by a distributed file system server for compacting change logs using file content location identifiers. Method 500 and/or each of its individual functions, routines, subroutines, or operations may be performed by one or more processors of the computer system (e.g., file server 150 of FIG. 1) executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a log processing agent running on the file system server may identify a first change log record comprising an identifier of a first data structure referencing a first physical location of contents of a file before a first file system operation, and an identifier of a second data structure referencing a second physical location of the contents of the file after the file first system operation.

At block 520, the file system server may identify a second change log record comprising the identifier of a third data structure referencing a third physical location of the contents of the file before a second file system operation, and an identifier of a further data structure referencing a fourth physical location of the contents of the file after the second file system operation; and Responsive to determining, at block 530, that the identifier of the second data structure matches the identifier of the third data structure, the file system server may, at block 540, replace the first and second change log records with a third record comprising the identifier of the first data structure and the identifier of the fourth data structure.

Responsive to determining, at block 550, that the identifier of the first data structure matches the identifier of the fourth data structure, the file system server may, at block 560, discard the newly inserted change log record, as describing a file system operation resulting in no changes to any file system objects.

At block 570, the replication agent may advance the pointer associated with the log file to point to the next log file record.

Responsive to determining, at block 580, that the end of log file has been reached, the method may terminate; otherwise, the method may loop back to block 510 to process the next change log record.

Figure 6:
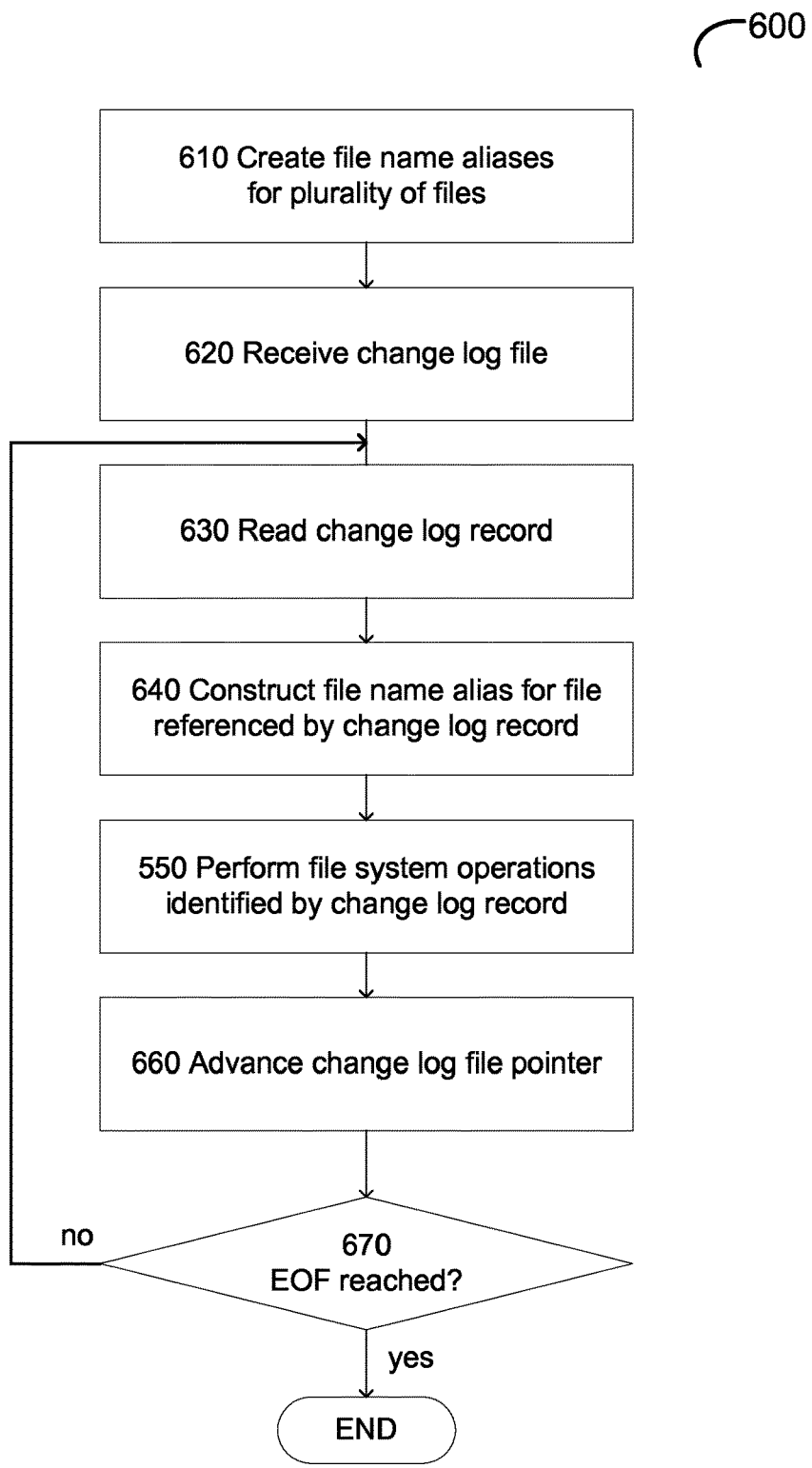
FIG. 6 depict a flow diagram of an example method for file replication using file content location identifiers, in accordance with one or more aspects of the present disclosure.

FIG. 6 depicts a flow diagram of an example method 600 performed by a distributed file system server for file replication using file content location identifiers. Method 600 and/or each of its individual functions, routines, subroutines, or operations may be performed by one or more processors of the computer system (e.g., file server 160 of FIG. 1) executing the method. In certain implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other.

At block 610, a file replication agent running on the file system server may create file name aliases for a plurality of files of a file system, as described in more details herein above. In an illustrative example, for each file, a file name alias comprising an identifier of the respective inode may be created, e.g., by creating a hard link with a name comprising the identifier of the inode referenced by the hard link. All such hard links may be placed in a pre-defined directory (e.g., a hidden directory) where they can be accessed by various clients.

At block 620, the file system server may receive a change log file comprising a plurality of records.

At block 630, the replication agent may read a change log record identified by a file pointer associated with the change log file. The change log record may reflect one or more file system operations performed upon one or more file system objects (e.g., creation, modification, or deletion of files or directories). The change log record may identify the file system objects by their respective inode identifiers, as described in more details herein above.

At block 640, the replication agent may construct a file name alias of the file referenced by the change log record by its inode identifier. In an illustrative example, the replication agent may by append the inode identifier referenced by the change log record to a path to a pre-defined directory that stores file name aliases, where each file name alias comprises the identifier of the inode that stores the metadata for the file referenced by the file name alias, as described in more details herein above.

At block 650, the replication agent may perform the file system operations specified by the change log record. In performing the file system operations, the replication agent may reference the file by the file name alias, as described in more details herein above. In an illustrative example, the file system operations to be performed may comprise copying the file from a master file server to a slave file server. In another illustrative example, the file system operation to be performed may comprise deleting a replica of the file on the slave file server. In another illustrative example, the file system operation to be performed may comprise renaming the replica of the file on the slave file server.

At block 660, the replication agent may advance the pointer associated with the log file to point to the next log file record.

Responsive to determining, at block 670, that the end of log file has been reached, the method may terminate; otherwise, the method may loop back to block 630 to process the next change log record.

Figure 7:
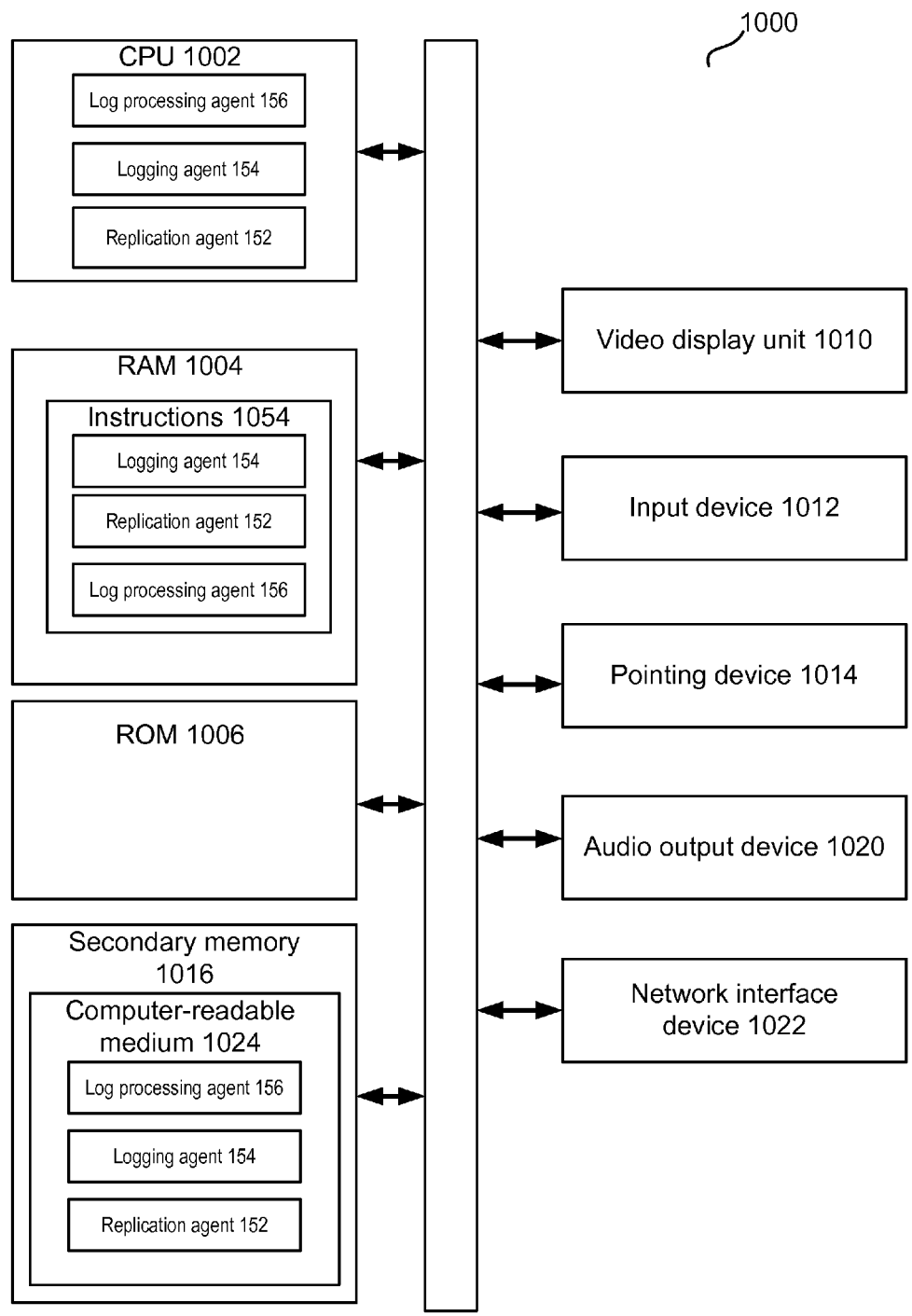
FIG. 7 depicts an illustrative computer system operating in accordance with one or more aspects of the present disclosure.

FIG. 7 depicts an illustrative computer system operating in accordance with examples of the present disclosure. In illustrative examples, computer system 1000 may correspond to file system server 140 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding file system server daemon 142 including logging agent 154, log processing agent 156, and replication agent 152 implementing method 400 for identifying files in change logs using file content location identifiers, method 500 for compacting change logs using file content location identifiers, and/or method 600 for file replication using file content location identifiers. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 and/or 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
identifying, by a processing device, a first change log record comprising: an identifier of a first data structure, an identifier of a second data structure, and an identifier of a first parent object, wherein the first data structure references a first physical location of contents of a file before a first file system operation, the second data structure references a second physical location of the contents of the file after the file first system operation, and the first parent object represents a first file system object comprising the file;
identifying, by the processing device, a second change log record comprising: the identifier of the second data structure, an identifier of a third data structure, and an identifier of a second parent object, wherein the third data structure references a third physical location of the contents of the file after a second file system operation, and the second parent object represents a second file system object comprising the file;
responsive to determining that the first parent object identifier matches the second parent object identifier, merging, by the processing device, the first change log record and the second change log record to produce a third change log record comprising the identifier of the first data structure and the identifier of the third data structure;
responsive to determining that the identifier of the first data structure matches the identifier of the third data structure, discarding the third change log record;
constructing a file name alias by appending the identifier of the third data structure to an identifier of a pre-defined directory; and
performing, using the file name alias, a third file system operation specified by the third change log record.

2. The method of claim 1, further comprising:
receiving a change log file comprising a plurality of change log records.

3. The method of claim 1, wherein at least one of the first file system operation or the second file system operation comprises at least one of creating the file, copying the contents of the file, deleting the file, or renaming the file.

4. The method of claim 1, wherein at least one of the first data structure, the second data structure, or the third data structure is provided by an index node.

5. The method of claim 1, wherein at least one of the first change log record, the second change log record, or the third change log record further comprises a name of the file.

6. The method of claim 1, wherein at least one of the first change log record, the second change log record, or the third change log record further comprises a timestamp.

7. A system, comprising:
a memory; and
a processing device, operatively coupled to the memory, to:
identify a first change log record comprising: an identifier of a first data structure, an identifier of a second data structure, and an identifier of a first parent object, wherein the first data structure references a first physical location of contents of a file before a first file system operation, the second data structure references a second physical location of the contents of the file after the file first system operation, and the first parent object represents a first file system object comprising the file;
identify a second change log record comprising: the identifier of the second data structure, an identifier of a third data structure, and an identifier of a second parent object, wherein the third data structure references a third physical location of the contents of the file after a second file system operation, and the second parent object represents a second file system object comprising the file;
responsive to determining that the first parent object identifier matches the second parent object identifier, merge the first change log record and the second change log record to produce a third change log record comprising the identifier of the first data structure and the identifier of the third data structure;
responsive to determining that the identifier of the first data structure matches the identifier of the third data structure, discard the third change log record;
construct a file name alias by appending the identifier of the third data structure to an identifier of a pre-defined directory; and
perform, using the file name alias, a third file system operation specified by the third change log record.

8. The system of claim 7, wherein the processing device is further to:
receive a change log file comprising a plurality of change log records.

9. The system of claim 7, wherein to perform at least one of the first file system operation or the second file system operation, the processing device is to perform at least one of: create the file, copy the contents of the file, delete the file, or rename the file.

10. The system of claim 7, wherein at least one of the first data structure, the second data structure, or the third data structure is provided by an index node.

11. The system of claim 7, wherein at least one of the first change log record, the second change log record, or the third change log record further comprises a name of the file.

12. The system of claim 7, wherein at least one of the first change log record, the second change log record, or the third change log record further comprises a timestamp.

13. A non-transitory computer-readable storage medium comprising executable instructions that, when executed by a processing device, cause the processing device to:
identify, by the processing device, a first change log record comprising: an identifier of a first data structure, an identifier of a second data structure, and an identifier of a first parent object, wherein the first data structure references a first physical location of contents of a file before a first file system operation, the second data structure references a second physical location of the contents of the file after the file first system operation, and the first parent object represents a first file system object comprising the file;
identify, by the processing device, a second change log record comprising: the identifier of the second data structure, an identifier of a third data structure, and an identifier of a second parent object, wherein the third data structure references a third physical location of the contents of the file after a second file system operation, and the second parent object represents a second file system object comprising the file;
responsive to determining that the first parent object identifier matches the second parent object identifier, merge, by the processing device, the first change log record and the second change log record to produce a third change log record comprising the identifier of the first data structure and the identifier of the third data structure;

responsive to determining that the identifier of the first data structure matches the identifier of the third data structure, discard the third change log record;

construct a file name alias by appending the identifier of the third data structure to an identifier of a pre-defined directory; and perform, using the file name alias, a third file system operation specified by the third change log record.

14. The non-transitory computer-readable storage medium of claim 13, further comprising executable instructions to cause the processing device to:

receive a change log file comprising a plurality of change log records.

15. The non-transitory computer-readable storage medium of claim 13, further comprising executable instructions to cause the processing device to perform at least one of creating the file, copying the contents of the file, deleting the file, or renaming the file.

16. The non-transitory computer-readable storage medium of claim 13, wherein at least one of the first data structure, the second data structure, or the third data structure is provided by an index node.

17. The non-transitory computer-readable storage medium of claim 13, wherein at least one of the first change log record, the second change log record, or the third change log record further comprises a name of the file.

18. The non-transitory computer-readable storage medium of claim 13, wherein at least one of the first change log record, the second change log record, or the third change log record further comprises a timestamp.

* * * * *